United States Patent [19]

Womack

[11] Patent Number: 5,308,508
[45] Date of Patent: May 3, 1994

[54] HIGH CAPACITY FILTER MEDIA, METHOD OF USE IN FILTRATION AND METHOD OF FORMATION

[75] Inventor: Thomas H. Womack, Novato, Calif.

[73] Assignee: Womack International, Inc., Novato, Calif.

[21] Appl. No.: 883,564

[22] Filed: May 15, 1992

[51] Int. Cl.⁵ .................. B01D 37/00; B01D 33/00
[52] U.S. Cl. .................... 210/767; 210/230; 210/231; 210/359; 210/387; 210/504; 210/509; 210/489; 210/508; 55/367
[58] Field of Search ........... 210/387, 231, 230, 504, 210/505, 509, 359, 489, 204, 508, 227, 767; 264/41, 41.5; 55/367, 487

[56] References Cited

U.S. PATENT DOCUMENTS

| | | |
|---|---|---|
| 194,016 | 8/1877 | Tittle et al. |
| 336,799 | 2/1886 | Derham |
| 633,368 | 9/1899 | Riddick, Jr. |
| 664,974 | 1/1901 | Searing |
| 1,764,660 | 6/1930 | Sweetland |
| 2,416,524 | 2/1947 | Huse et al. ............ 210/204 |
| 2,609,932 | 10/1948 | Fricke |
| 2,711,828 | 5/1955 | Webb et al. |
| 2,911,101 | 11/1959 | Robinson |
| 3,039,914 | 6/1962 | Reiman ............ 210/509 |
| 3,042,216 | 7/1962 | Coleman |
| 3,142,612 | 7/1964 | Reiman ............ 210/509 |
| 3,209,916 | 10/1965 | May et al. |
| 3,455,459 | 7/1969 | Troy |
| 3,511,382 | 5/1970 | Mesek |
| 3,800,945 | 4/1974 | Fowler |
| 4,025,438 | 5/1977 | Gelman et al. ............ 210/484 |
| 4,156,601 | 5/1979 | Pieciak ............ 55/367 |
| 4,157,968 | 6/1979 | Kronsbein ............ 210/489 |
| 4,242,206 | 12/1980 | Estabrooke ............ 210/489 |
| 4,485,011 | 11/1984 | Cole et al. ............ 210/96.1 |
| 4,588,500 | 5/1986 | Sprenger et al. ............ 210/100 |
| 4,589,983 | 5/1986 | Wydevan ............ 210/317 |
| 4,684,466 | 8/1987 | Terpstra ............ 210/227 |
| 4,701,197 | 10/1987 | Thornton et al. ............ 210/508 |
| 4,734,208 | 3/1988 | Pall et al. ............ 210/509 |
| 4,759,782 | 7/1988 | Miller et al. ............ 55/487 |
| 4,805,656 | 2/1989 | Cole et al. ............ 138/41 |
| 4,877,527 | 10/1989 | Brownell ............ 210/489 |
| 4,911,842 | 3/1990 | Hoffmann ............ 210/489 |
| 4,925,560 | 5/1990 | Sorrick ............ 210/387 |
| 4,950,400 | 8/1990 | Girondi ............ 210/335 |
| 5,015,388 | 5/1991 | Pusineri et al. ............ 210/641 |
| 5,059,318 | 10/1991 | Benesi ............ 210/387 |

OTHER PUBLICATIONS

U.S. Patent Re. 24,081, Issued Oct. 25, 1955.

Primary Examiner—Robert A. Dawson
Assistant Examiner—Ana M. Fortuna
Attorney, Agent, or Firm—John A. Bucher

[57] ABSTRACT

A depth filtration method employing a depth filter media sheet, a method of forming the depth filter media sheet and the structure of the depth filter media sheet are described wherein the depth filter media sheet is formed from a wet strength layer and a filter septum layer, the filter septum layer being substantially thicker than the wet strength layer and being formed as a matrix from at least one fiber selected to provide substantial loft and pore structure throughout the filter depth of the filter septum layer, the wet strength layer and the filter septum layer being arranged adjacent each other and preferably bonded together with a lateral surface of the filter septum layer being substantially totally exposed for receiving fluid to be filtered with the porous matrix of the filter septum layer being available to receive and capture particulate solids from the fluid, the filter septum layer also preferably including a second fiber or additional fibers selected in combination with the first fiber for defining and maintaining pore structure within the filter septum layer.

11 Claims, 2 Drawing Sheets

HIGH CAPACITY FILTER MEDIA, METHOD OF USE IN FILTRATION AND METHOD OF FORMATION

FIELD OF THE INVENTION

The present invention relates to a method of filtration and a filter media employed therein for developing enhanced filtration capacity as well as a method of forming the filter media.

BACKGROUND OF THE INVENTION

In a wide variety of filtration methods employed for removing particulate solids from a fluid to be filtered, the fluid is caused to pass through a filter device from its inlet or dirty chamber to its outlet or clean chamber through a filter media dividing the two chambers.

The filter media is preferably formed as an elongated sheet so that a fresh surface of the filter media can be arranged within the filter press between the chambers following the buildup of sufficient particulate solids on an initial portion thereof. Typically, the filter press may be opened allowing the spent portion of the filter media, that is, a portion of the filter media receiving particulate solids within the filter press, to be removed from the filter press and replaced by a fresh surface portion of the filter media.

Filter applications tend to be characterized by the development of a relatively high pressure drop across the filter media for causing fluid to be filtered to pass from the inlet chamber to the outlet chamber through the filter media. It is generally desirable to employ a filter media capable of receiving as much particulate solid as possible before requiring operation of means for replacing the spent portion of the filter media with a fresh surface portion. Typically, the need for changing the filter media arises when a predetermined pressure drop is developed across the filter media as a result of particulate solids built-up thereon and/or therein.

In such filter applications, it is accordingly desirable to increase the filtration capacity of the filter media, that is, the amount of particulate solids buildup which can be received upon and/or within the filter media, not only to achieve maximum solids removal per operating cycle but also to minimize the amount of solid waste provided by the filter media itself.

It is important to distinguish filtration capacity of a filter media, as referred to above, in contrast to filter efficiency. Generally, filter efficiency merely refers to the percentage of particulate solids of various sizes retained by the filter media and removed from the fluid being filtered. Filtration capacity, on the other hand, refers to the total mass of particulate material deposited and retained upon and within a given matrix unit area of the filter media. This definition is particularly applicable to a depth filter media as described herein.

The present invention particularly contemplates filter applications of a type wherein the filter media is generally not reusable but is discarded together with the particulate solids removed from the fluid being filtered. Since the particulate solids represent a necessary disposal component, the total amount of solids to be disposed of from the filtering application can best be minimized by reducing the amount of filter media accompanying the particulate solids, and/or increasing the amount of solids retained per unit volume of filter media.

For filter applications of the type referred to above, filter media has long been employed wherein relatively thin and open wet strength layers are arranged on opposite surfaces of the filter media. The relatively thin and open structure of the wet strength layers are desirable for permitting maximum flow of fluid to be filtered through the filter media. Typically, one or more layers of filter septum material have been arranged between the wet strength layers to achieve depth filtration as described above. Furthermore, the wet strength layers have typically been bonded to the filter septum material, preferably by binder or adhesive which is commonly sprayed onto a surface of the filter septum material. The wet strength layer is then pressed onto the filter septum material in order to bond the two layers together. Bonding of the layers is generally necessary to maintain continuity of the filter media, for example, when it is replaced in the filter apparatus. The wet strength layer, by itself, is typically quite open and presents very little interference to the flow of liquid to be filtered through the filter media. However, the manner in which binder is commonly applied to bond the wet strength layer to the filter septum material typically results in the binder itself being a much greater cause of blinding or flow reduction than the wet strength layer itself.

In such filter media structures, the wet strength layers provide tensile strength for maintaining integrity of the spent filter media as it is extracted or removed from the filter press and also to support the filter media against relatively high flow rates and substantial pressure differentials developed within the filter press.

The filter septum layers for filter media of the type disclosed above have generally been formed from a wide variety of materials in order to provide the desired loft and porosity.

U.S. Pat. No. 4,925,560 issued May 15, 1990 to Sorrick disclosed such a filter media wherein the filter septum layer was formed from a combination of cellulosic material and microfiber for developing a filter septum for achieving relatively efficient depth filtration as described above. The Sorrick patent specifically provided wet strength layers bonded to both sides of the filter septum layer in order to provide support as described above and also for the express purpose of preventing the filter septum layer from adhering or sticking to edges of the filter press, particularly as a given portion of the filter media was indexed into and then out of a filtering position in the coolant flow path.

Numerous other prior art references disclosed additional filter media structures for use in such filter applications. For example, U.S. Pat. No. 4,734,208 issued Mar. 29, 1988 to Pall, et al. disclosed a filter media including microfiber coated with material for achieving a desired charge modification of the filter media in order to further enhance its filtering efficiency.

Such prior art filtering methods and filter media, provided for example by prior art as noted above, were generally effective for their intended purposes. However, there has been found to remain a need for further improvements in such filtering methods and filter media employed in such filter methods.

SUMMARY OF THE INVENTION

More specifically, it is an object of the present invention to provide a depth filtration method and a depth filter media for use in such methods, the depth filter media being capable of substantially increased filter media capacity. As defined herein, filter media capacity is contemplated by the present invention to include an increased build-up or accumulation of particulate solids on and/or within the filter media before it is necessary to replace the filter media or a portion of the filter media in the filter operation. As defined herein, maximum accumulation of particulate solids on or within the filter media is generally achieved by development of the filter media to have substantial depth filtration capabilities so that particulate solids are received and captured throughout the porous depth of the filter media.

Because of the desirability for achieving maximum accumulation of particulate solids for reasons discussed above, the present invention particularly contemplates a filter media of a type adapted for "depth filtration". This term is employed to indicate penetration of the particulate solids into the filter media rather than simple deposition of particulate solids from the fluid being filtered upon an exposed surface of the filter media. Accordingly, the filter media contemplated by the present invention typically includes a filter septum layer having substantial loft and porosity for achieving such depth filtration. The terms "loft" and "porosity" are thus important to the invention. The term "loft" is employed to indicate general density of material in the filter septum with desired porosity being in the form of generally tortuous pores or channels of substantial depth. Such a configuration is desirable for receiving and capturing particulate solids across the dimension of the filter septum in accordance with the concept of depth filtration as noted above. An additional characteristic of "resilience" is important for maintaining the loft or reduced density of the material in the filter septum. Preferably, resilience may be achieved at least in part by the addition of synthetic microfibers which not only provide structural support but also interact with the larger cellulosic fibers for effectively reducing pore size throughout the filter septum material.

As noted above, the terms "depth filter media" and "depth filtration" are important to the concept of the present invention.

Generally, a depth filter media is one having substantial tortuous paths which are capable of receiving and retaining smaller particulate material upon and within the cross-section of the filter media itself. Preferably, the depth filter media is formed with a matrix of multi-directional fibers forming the tortuous passages so that they are capable of trapping and retaining the smaller particles. A depth filter media accomplishes filtration at least partly because fluid passing through the filter media is caused to change direction as it passes through the multi-directional fibers. This in turn causes very fine particulate material in the liquid to be deposited and retained in niches or crevices even though the particles may be smaller than the openings in the media.

The use of depth filtration according to the present invention is intended to combine the advantages of cake filtration and surface filtration. In this context, cake filtration refers to the build-up of a filter cake either from particulate solids in the liquid being filtered or by means of a filter aid. The filter cake forms passages for trapping very small particulate material of the type contemplated by the present invention. Because of the accumulation characteristics, a pressure differential across the cake and a supporting filter media tends to increase in a generally straight line relationship as the thickness of the cake increases.

By contrast, surface filtration generally refers to deposit of all particulate material from a liquid being filtered directly onto the surface of the filter media. This commonly results in an impenetrable mass being deposited upon the filter media surface with a pressure differential thereacross being generally exponential, that is, the pressure differential increases exponentially as the restriction to flow increases due to surface accumulation of particulate material.

With a depth filter media as contemplated by the present invention, the filter media itself serves a similar purpose as the cake referred to above. In other words, the depth filter media forms passages throughout its matrix which are capable of trapping and retaining very small particles, preferably in the range of about 1–5 microns.

In order to assure continued effectiveness of such a depth filter media, it is also important that the filter media remain open at its top surface or, in other words, that it not be blinded by components of the filter media itself such as the wet strength layer or an associated binder or by particulate material deposited from the liquid being filtered. The present invention novelly assures that the depth filter media remains open by avoiding the use of adhesive or wet strength material formed on the top surface of the filter media receiving the liquid to be filtered. Accordingly, it is particularly important to understand that depth filtration is accomplished by the filter septum layer of the present invention and that the top surface of the filter septum layer itself remains exposed for receiving the liquid to be filtered.

It is further important to define the depth filtration method and depth filter media of the present invention with relation to the size range and amounts of particulate materials in the liquid to be filtered. Generally, depth filtration is employed for removing solids and more typically inorganic solids in a broad range of particulate material forming up to about 5,000 parts per million of the liquid to be filtered. More specifically, the concentration of particulate solids in the liquid to be filtered is dependent upon the particular application where the filter is being employed. More specifically, the minimum amount of solids to be filtered may be as low as 50 parts per million and even lower in some applications. Conversely, concentrations of greater than 5,000 parts per million may be effectively filtered in some applications.

As for particle size, depth filtration is generally contemplated for purposes of the present invention to include applications where the minimum particulate size is about 50 microns or less, usually with a substantial portion of the particulate solids being smaller than 50 microns. More preferably, depth filtration is contemplated for the present invention where particulate solids have a minimum size in the range of about 1–25 microns. As will be apparent from the following description, the depth filter media of the present invention is particularly useful for removing a substantial portion of those particulate solids.

It is a related object of the invention to provide filtration methods and filter media capable of minimizing waste disposal from the filtration methods. As noted above, filtration methods are contemplated by the present invention to generally require disposal of the spent filter media together with particulate solids deposited thereon and/or therein. This contrasts for example to reusable filter media where the particulate solids are usually deposited on a surface of the filter media and are capable of removal in order to permit reuse of the filter media. Since the particulate solids generally represent a fixed amount of solid material for disposal, the total solids to be disposed of in such filtration methods depend upon the amount of filter media accompanying the particulate solids. Thus, it is particularly desirable to minimize the amount of filter media accompanying the particulate solids or, in other words, to achieve maximum filter media capacity with a maximum amount of particulate solids being deposited upon or within the filter media before replacement is required in the filtration apparatus.

It is a further related object of the invention to provide such a depth filtration method, a depth filtration media for use in such methods and a method of forming the depth filter media wherein the filter media is formed from a single layer of wet strength material and a substantially thicker filter septum layer formed from a fiber or mixture of fibers to provide substantial loft and porosity throughout the thickness of the filter septum layer. Opposite surfaces of the filter media being formed respectively by the filter septum layer and the wet strength layer so that fluid to be filtered can enter directly into the filter septum layer through a lateral surface thereof and be subject to depth filtration for receipt and capture of particulate solids from the fluid throughout the matrix of the filter septum.

Within a filtration method and filter media as summarized above, filter media capacity is enhanced by exposure of an entire available surface of the filter septum layer for receiving fluid to be filtered. In this manner, the filter media presents minimum resistance to the flow of fluid therethrough. At the same time, substantially the entire breadth and depth of the filter septum layer is available for true depth filtration in order to achieve maximum accumulation of particulate solids in the filter septum prior to its replacement in the filter apparatus.

The amount of waste solids to be disposed of from filtration methods contemplated by the present invention are minimized, as noted above, since relatively greater amounts of particulate solids are received by each portion of the filter media. At the same time, the amount of disposable waste solids represented by the filter media itself is minimized since the filter media includes only the filter septum and a single wet strength layer.

Thus, the configuration of the filter media of the present invention has a two-fold advantage. Initially, its configuration with the top surface of the filter septum being totally exposed maximizes filter media capacity with a substantial increase in the amount of particulate solids captured on or within a given portion of the filter media. Secondly, the configuration of the filter media minimizes the amount of filter media accompanying the particulate solids as solid waste, both because of the enhanced filtration capacity as noted above and also because of the reduced amount of material in the filter media.

A still further advantage of the present invention has been found to result from total exposure of the top surface of the filter septum. In this respect, the top surface of the filter septum is referred to as that surface through which liquid or fluid to be filtered enters the filter media. When employed in a filter apparatus of a type including multiple filter plates pressing against both sides of the filter media, there has been found to be substantially no indication of sticking between the exposed surface of the septum layer with the adjacent filter plate, whether formed from steel, aluminum or a composite such as glass reinforced polypropylene. Sticking is of course of greater concern with metal filter plates, formed, for example, from steel or aluminum. Also, sticking tended only to occur during these tests between the wet strength layer and the adjacent filter plate surface.

In this regard, it is generally theorized that sticking results from one or more of a variety of causes including:

(a) tendency of exposed fibers on the wet strength layer to exhibit either a "fishhook" or "VELCRO" effect tending to stick to the filter plate surfaces;
(b) binder applied to the interface of the wet strength layer and filter septum layer being extruded through the relatively thin wet strength layer and adhering to the filter plate surface; or
(c) some combination of the above.

The particular filter media configuration contemplated by the present invention without a wet strength layer or interface binder on the so-called exposed top surface of the filter septum tends to minimize or eliminate all of the causes for sticking as summarized above. Accordingly, the filter media of the present invention has been found to be particularly desirable for minimizing sticking on steel and aluminum filter plates and even more effectively minimizing the possibility of sticking or even entirely eliminating the possibility of sticking on composite filter plates formed from materials such as glass reinforced polypropylene.

Additional objects and advantages of the present invention are made apparent in the following description having reference to the accompanying drawings.

DESCRIPTION OF THE PREFERRED EMBODIMENT

Figure 1:
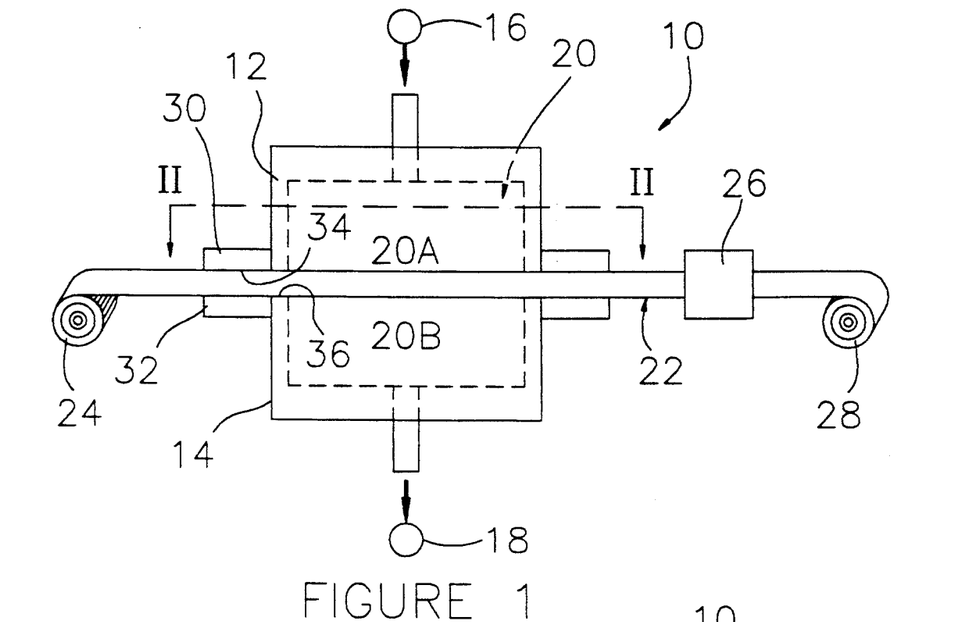
FIG. 1 is a generally schematic representation of apparatus of a type employed in filtration methods contemplated by the present invention.

Filtration methods of the type contemplated by the present invention are performed in filtration apparatus such as that generally indicated at 10 in FIG. 1. The filter apparatus 10 is commonly referred to as a filter press and includes relatively movable filter plates 12 and 14. One of the filter plates, such as that indicated at 12 is connected with an inlet 16 for receiving fluid to be filtered. Typically, the fluid is a liquid and even more typically water or water based fluids containing particulate solids (not shown) to be removed during the filtration method. The other filter plate 14 is connected with an outlet 18 for receiving fluid passing through the filter apparatus and having particulate solids removed. Thus, the filtered fluid may be disposed of or recycled for further use, depending upon the particular application in which the filter apparatus 10 is employed.

Within the filter apparatus, a chamber 20 is formed between the filter plates 12 and 14 as described in greater detail below.

Filtration within the filter apparatus 10 is performed by means of a filter media 22 which is preferably in the form of an elongated strip. For example, the filter media 22 may be supplied to the filter apparatus from a supply roll 24 arranged on one side of the filter apparatus 10. After a portion of the filter media 22 is exhausted by the collection or accumulation of particulate solids thereon and/or therein, the filter media is typically extracted from the filter apparatus, for example, by means of an extractor 26 so that the spent or exhausted filter media 22 is stored for waste disposal together with particulate solids accumulated thereon and/or therein, for example, by means of a take-up roll 28. However, such an extractor and/or take-up roll is not necessary, for example, where the filter media is manually extracted.

During filtration operations, the filter media is caused to pass between the filter plates 12 and 14 in order to divide the chamber 20 into an inlet chamber 20A in communication with the inlet 16 and an outlet chamber 20B in communication with the outlet 18. With the filter media positioned between the filter plates, they are closed under substantial pressure by conventional press means (not shown) so that seal surfaces 30 and 32 respectively surrounding the filter plates 12 and 14 trap the filter media therebetween and form a seal for the interior chambers 20A and 20B.

In operation, fluid to be filtered is supplied under pressure from the inlet 16 into the inlet chamber 20A. As the fluid passes through the filter media from the inlet chamber 20A to the outlet chamber 20B, particulate solids from the fluid are received and captured by the filter media in a manner described in greater detail below. Fluid with the particulate solids removed therefrom passes to the outlet chamber 20B and then to the outlet 18 for disposition as noted above.

As noted above, a given portion of the filter media is generally employed within the filter apparatus 10 until an unacceptable high pressure differential is developed thereacross because of the collection of particulate solids. The filter media is then replaced in order to employ a fresh portion of the filter media within the filter apparatus.

For replacement of the filter media, the flow of fluid through the filter apparatus is temporarily interrupted, the filter assembly is voided of fluid and the filter plates 12 and 14 are separated from each other. The filter media is then withdrawn from the filter apparatus. At the same time, a fresh surface portion of the filter media 22 is drawn, for example, from the supply roll 24 into the filter apparatus. At that time, the filter plates 12 and 14 are again pressed into engagement with each other to capture and seal the fresh supply of filter media therebetween and the filtration operation continued with the flow of additional fluid from the source 16.

Figure 2:
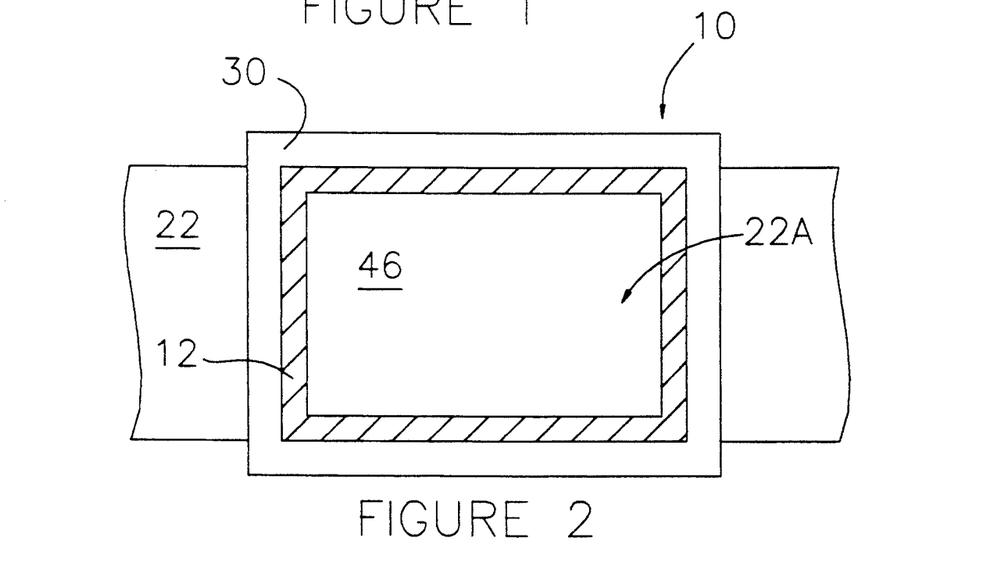
FIG. 2 is a view taken along section line II—II of FIG. 1.

During each filtration cycle as described above, prior to opening of the filter apparatus and extraction of the filter media, particulate solids collect on or in a portion of the filter media as generally indicated at 22A in FIG. 2. With the portion 22A of the filter media being exposed within the filter apparatus, a surrounding portion of the filter media is clamped between the seal surfaces 30 and 32. The filter media interacts with the seal surfaces to provide a seal between the filter plates 12 and 14. The filter media is preferably in the form of a sheet so that the filter media can be readily replaced within the filter apparatus. Substantial pressure is applied to both surfaces of the filter media by the seal surfaces 30 and 32 of the filter plates 12 and 14 during each filtration cycle. There has been found in the past to be a tendency for the filter media to stick or adhere to the surfaces 34 and 36 of the filter plates following a filtration cycle when the filter plates 12 and 14 are separated prior to operation of the extractor 26. This tendency for sticking or adhesion is discussed in greater detail below in connection with the structure of the filter media itself.

Figure 3:
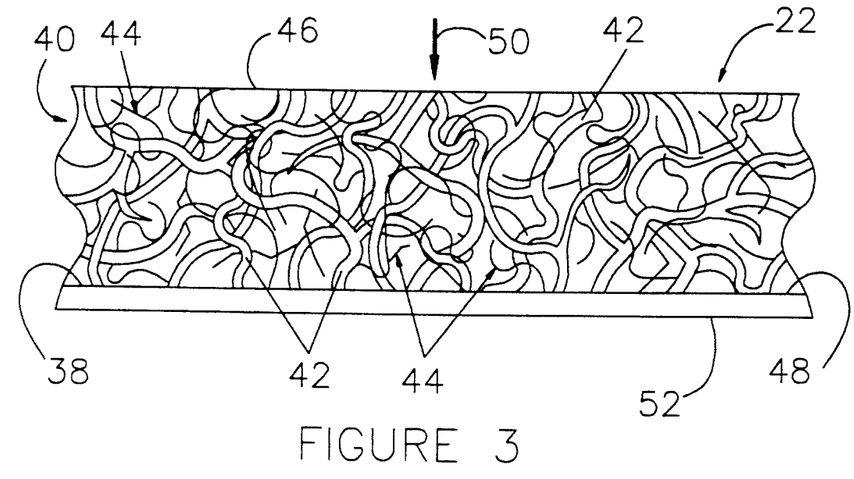
FIG. 3 is an enlarged view in cross-section of a filter media constructed in accordance with the present invention.

Referring now to FIG. 3, the structure of the filter media 22 is described in greater detail below. As noted above, the filter media is designed to achieve three particular advantages for the present invention which are summarized immediately below and described in greater detail thereafter.

(A) An initial advantage is an increased filtration capacity for the filter media made possible by exposing the top surface of the filter septum layer to directly receive fluid to be filtered. Exposure of the filter septum surface as described in greater detail below is believed to increase filtration capacity because particulate solids carried by the fluid to be filtered can more readily penetrate into the pores within the interior of the filter septum layer. The pores formed by the filter septum layer are thus capable of more effectively receiving and capturing the particulate solids. The filter media of the present invention thus has an increased filter capacity, that is, the ability to receive and retain greater amounts of particulate solids before an unacceptable pressure differential develops across the filter media. The greater filtration capacity achieved by the present invention is believed to be due to the removal of wet strength material from the top surface of the filter septum layer and more particularly the elimination of binder at the interface between the top surface of the filter septum layer and the adjacent wet strength layer. As noted above, the binder securing the wet strength material to the filter septum layer in the prior art commonly exhibited a blinding effect on substantial portions of the filter septum layer which severely limited the capacity of the filter septum layer for receiving and capturing particulate solids per unit volume of filter media. Also, the addition of synthetic microfibers to the furnish, which makes up the filter septum layer, provides structural support or resistance to pore structure collapse when wetted and subjected to differential pressure. In other words, the synthetic microfibers assist in maintaining loft throughout the septum layer during use.

(B) The filter media of the present invention has also been found to be non-sticking, at least on the exposed top surface of the filter septum layer. The lower surface of the filter media or, more specifically, the surface formed by a wet strength layer exhibits generally similar sticking tendencies as prior art filter media similarly including wet strength layers on the surface of the filter media. However, since the filter media of the present invention is non-sticking on at least one surface, problems resulting from sticking are substantially diminished.

(C) Thirdly, the filter media of the present invention substantially reduces solid waste for two reasons. Initially, the increased filter capacity of the filter media allows the collection or accumulation of greater amounts of particulate solids per unit volume of filter media so that the filter media disposed together with the particulate solids represents a smaller proportion of the waste. In addition, since the filter media does not include a wet strength layer or interface binder on the upper exposed surface, there is actually less material in the filter media which even further reduces solid waste. Furthermore, this represents as much as a 50% reduction in non-biodegradable solid waste, since the wet strength layers are generally made of high strength synthetic fibers.

The above advantages are described in greater detail below in connection with a specific description of the filter media 22.

Continuing with reference particularly to FIG. 3, the filter media 22 includes a single bottom wet strength layer 38. The wet strength layer 38 is very thin and open in order to minimize flow restriction thereacross. At the same time, the wet strength layer 38 has substantial tensile strength in order to support the filter media during normal operation and also to facilitate lateral extraction of the spent filter media, particularly when it is wet and laden with particulate solids. The composition and configuration of the wet strength layer is generally conventional and well known from the prior art. Typically, the wet strength layer may be a synthetic fiber which is "non-woven" in order to assure that it is open to flow of fluid to be filtered as noted above. The wet strength material may comprise one or more fibers selected from the class consisting of polyester, nylon, polypropylene, polyester and polyethylene as well as other synthetic fibers capable of preferably forming the wet strength layer as an open sheet having good tensile strength. Furthermore, it is to be noted that the wet strength layer could also be formed from cellulosic gauze or the like which is designed to have satisfactory tensile strength as noted above.

A filter septum layer 40 is formed from a fiber selected for providing substantial loft and porosity. Preferably, the filter septum layer is many times thicker than the wet strength layer, typically, at least ten times as thick. Where the wet strength layer 38 is open to present minimum flow restriction to fluid to be filtered, the fiber or fiber combination of the filter septum layer 40 is selected for providing substantial "loft" and "porosity". In this regard, the term "loft" relates to general density of the filter septum layer while the term "porosity" refers to the formation of openings or pores which are preferably elongated for receiving and capturing particulate solids throughout the thickness of the filter septum layer 40. For these reasons, the filter septum layer 40 is preferably adapted for "depth" filtration which, in other words, is defined as the ability to capture and retain particulate solids throughout the entire area and thickness of the filter septum layer.

The terms of loft and porosity are difficult to define, at least in a numerical sense for purposes of the present invention. However, porosity is intended to refer to pores formed throughout the matrix of the filter septum layer, the size and tortuous characteristics of the pores being capable of receiving and trapping particles in the preferred minimum size range of less than 50 microns and more preferably in the minimum size range of 1–25 microns. Loft refers to the capability of the filter septum layer for maintaining density characteristics so that the porous structure remains open for receiving the fluid to be filtered and more particularly the particulate solids to be entrapped within the filter septum layer. Although the characteristics of loft and porosity are difficult to illustrate, they are believed inherent in the combination of cellulosic fibers and synthetic microfibers forming the filter septum layer as illustrated in FIG. 3.

Cellulosic fibers are a preferred type of fiber for use in the filter septum 40 in order to achieve both loft and porosity. Such cellulosic fibers may be cotton and/or wood products for example and are generally characterized as being flat and helical along their lengths so that, in combination, they tend to produce the desired loft or low density as well as relatively large scale porosity.

Cellulosic fibers, at least in an untreated condition, generally absorb liquids during filtration. Upon being soaked with liquid, the untreated cellulose fiber may tend to collapse, especially under the substantial pressure differentials developed across the filter media, so that the desirable characteristics of both loft and porosity tend to be substantially diminished. The loft and porosity of the cellulose fibers could be retained, for example, by coating or treating the fibers with material in order to prevent the filter septum from absorbing liquids being filtered.

Yet another approach for maintaining the characteristics of loft and porosity is to blend the cellulosic fiber with an additional fiber such as a synthetic microfiber which is very fine and combines with the cellulose fiber for reducing the effective size of pores formed in the filter septum layer. This characteristic is illustrated in FIG. 3 where the first cellulosic fibers are generally indicated at 42 and the second or microfiber component is generally indicated at 44.

As noted above, the cellulose fibers, typically formed from cotton or wood pulp, for example, are relatively thick. By contrast, synthetic microfibers are very fine, typically having a fiber thickness in the range of about 0.3 up to about 3–4 microns. Usually, the microfibers are relatively short, that is, no more than about 1 millimeter. However, synthetic microfibers suitable for use in the invention may be selected which are relatively long, that is, having a minimum length of at least 5–10 millimeters. It is further noted that the microfibers are relatively expensive and it is accordingly desirable to employ the microfiber only as necessary for achieving desired characteristics while otherwise minimizing the amount of microfiber for economic purposes.

Suitable microfiber materials according to the present invention include glass, polyester, polypropylene, polyethylene, nylon and other synthetic fibers having generally similar characteristics. It is generally believed that all of these synthetic fibers are available in both short and long lengths described above. Typically, the synthetic fibers are relatively straight and round while normally resisting absorption of liquids because of their synthetic composition.

Referring again to FIG. 3, the filter septum layer 40 is formed with at least 50% of the initial or cellulosic fiber and even more preferably up to as much as 90–95% of the initial or cellulosic fiber in order to achieve the desirable loft and porosity. In connection with porosity, the initial or cellulosic fibers tend to form relatively large pores (not shown) extending throughtout the depth of the filter layer 40. In FIG. 3, the elongated pores are formed by the initial or cellulosic fibers 42. The initial or cellulosic fiber 42 may be employed by itself, for example, in applications where it does not absorb the fluids being filtered or possibly where the initial or cellulosic fiber is coated or treated with synthetic resin or the like to negate its liquid absorbing characteristics, or in some applications, synthetic microfibers may not be used for chemical, environmental or economic reasons. In such cases, the initial or cellulosic fiber may be employed by itself with the desirable characteristics of loft and porosity being maintained throughout filter operations until maximum accumulation of particulate solids is achieved in the filter media.

The initial or cellulosic fiber is preferably employed in combination with the second or microfiber component or a combination of microfiber components as described elsewhere.

In such an event, the microfibers indicated at 44 tend to intersect the elongated pores in order to effectively diminish the size of the pores. At the same time, the microfibers tend to provide a reinforcing effect where they resist collapse of the cellulosic fiber 42 so that the desirable characteristics of loft and porosity are maintained even in applications with liquids being filtered and substantial pressure differentials developed across the filter media.

In any event, the filter media 22 of the present invention has been found to exhibit a substantially increased filter capacity in tests comparing it with filter media having similar filter septum layers covered on both sides by wet strength material.

It is believed that the increased depth filtration capacity of the depth filter media 22 is due to substantially complete or total exposure of a surface 46 of the filter septum layer 40 for directly receiving fluid to be filtered. This effect is discussed in greater detail above.

Referring particularly to FIG. 3, it may be seen that the filter septum layer 40 is bonded to the wet strength layer 38 at an interface 48 by various bonding techniques summarized below. At the same time, the filter media 22 of FIG. 3 is positioned so that fluid to be filtered passes through the filter media in a direction indicated by the arrow 50. In other words, the fluid to be filtered is caused to penetrate directly into the exposed surface 46 of the filter septum layer 40 so that it is free to penetrate into the porous depth of the filter septum.

By contrast, prior art filter media having similar filter septum layers as that indicated at 40 have typically included a wet strength layer both above and below the filter septum layer, thus preventing a surface of the filter septum from being completely exposed directly to receive the fluid to be filtered. Furthermore, the wet strength material was typically bonded at its interface to the filter septum so that the fluid to be filtered tended to be restricted in its passage into the filter septum layer by the initial wet strength layer (not shown) to some extent and to a greater extent by its binder as discussed below. The above references to a wet strength layer being formed above the filter septum layer or on the inlet side thereof is only for purposes of comparing the filter media of the present invention to the prior art.

Some bonding at the interface 48 is necessary in order to maintain proper register between the filter septum layer 40 and the wet strength layer 38, for example, when the filter media 22 is being unrolled and initially positioned in the filter apparatus or when it is being extracted from the filter apparatus. Even though the wet strength layer 38 is on the downstream side of the filter septum layer 40 relative to the direction of flow indicated by the arrow 50, it does tend to provide some resistance to fluid flow through the filter media. This flow resistance is further enhanced when a typical interface binder such as melamine formaldehyde is employed at the interface 48 for bonding the wet strength layer 38 to the filter septum layer 40.

Generally, it is desirable to eliminate or minimize the use of binders since they tend to provide flow restriction particularly at the interface 48. For this reason, it may be preferable to avoid the use of binders at the interface 48 and rather to employ a process such as hot calendaring with at least some component in the filter septum layer 40 or the wet strength layer 38 being thermoplastic so that thermoplastic fusing is achieved at the interface 48 to accomplish the necessary bonding with a minimum of cross-sectional flow resistance.

Even if chemical binders are employed, it is generally desirable to exclude binders which are soluble in a given application, that is, in the fluid being filtered, or which are chemically reactive with the fluid.

It is of course also possible to add polarizing coatings or additives, as discussed for example in the Pall, et al. reference, if necessary or desirable for a given filtration application.

The filter media 22 is preferably manufactured by a method generally referred to in the preceding description. In any event, the wet strength layer 38 and filter septum layer 40 are formed as described above and then bonded together at their interface 48 so that the surface 46 of the filter septum layer 40 is totally exposed on one side of the filter media 22 referred to herein as the top surface. At the same time, a surface 52 of the wet strength layer 38 is exposed on the opposite or downstream side of the filter media 22.

The filter septum layer 40 may include a binder for securing together the cellulosic fibers 42 and the microfibers 44. However, if such a binder is present in the filter septum layer, it is very uniformly distributed throughout the matrix of the layer. Because of its uniform distribution, it would not interfere with flow through the filter septum layer but could actually assist in forming desired porosity therein. Accordingly, binder present within the filter septum layer 40 is to be contrasted from a layer of binder existing for example at the interface 48. At least in the prior art, bonding at the interface 48 is developed by spraying binder onto a surface of the filter septum layer 40 and then pressing the wet strength layer 38 into place.

Figure 4:
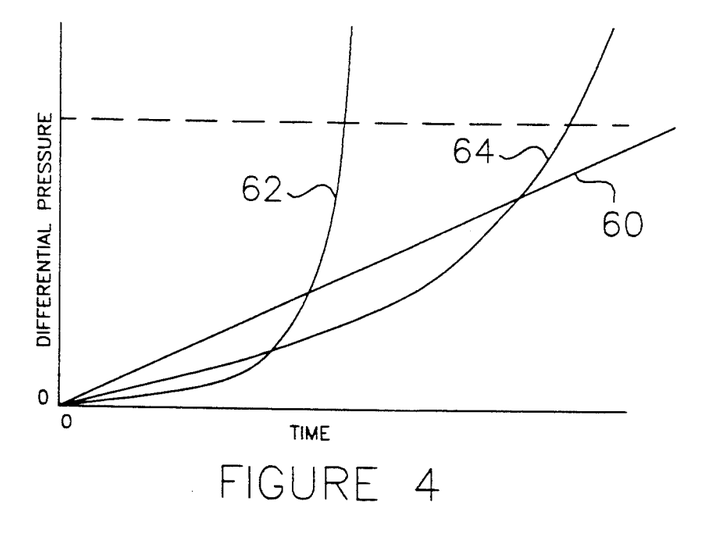
FIG. 4 is a graphical representation of differential pressure developed in the depth filter media of the present invention in comparison with cake filtration and surface filtration.

Desirable characteristics of the filter media 22 of the present invention are graphically illustrated in FIG. 4 in comparison with cake filtration characteristics and surface filtration characteristics considered typical in the prior art. A comparison of these characteristics was also discussed above in the Summary of the Invention. As noted therein, cake filtration is particularly desirable because a pressure differential across the cake and a supporting filter media (not shown) tends to increase in a generally straight line relationship as generally indicated at 60 in FIG. 4. This straight line relationship is particularly desirable since it permits continued filtration for extended periods of time without changing the filter media or cake. However, cake filtration is relatively undesirable because of the need for forming the cake and also for disposing of the cake together with particulate solids removed in the filter.

Surface filtration was also discussed above and resulted in a pressure differential developed across the particulate solids deposited upon the filter media which increases exponentially as the restriction to flow increases due to surface accumulation of the particulate material. The exponential pressure differential increase for surface filtration is generally illustrated by the curve indicated at 62 in FIG. 4. Although surface filtration avoids dealing with a filter cake, the exponential increase of the pressure differential is undesirable since it prevents continued filtration over extended periods of time.

As noted above, the depth filter media and depth filtration methods of the present invention are particularly desirable since they result in a pressure differential which increases in a manner more similar to the pressure differential increase for cake filtration techniques discussed above. More specifically, with the depth filter media and depth filtration techniques of the present invention, a pressure differential across the filter media and particulate solids deposited upon and/or within the filter media increases in a manner substantially more comparable to the curve 60 for cake filtration. In FIG. 4, a curve illustrating the increase of the pressure differential across the depth filter media of the present invention with particulate solids thereon and/or therein is generally indicated at 64. It may be seen that the curve 64 generally approaches the desirable straight line characteristics of the curve 60 for cake filtration. At the same time, the depth filter media of the present invention also avoids the need for dealing with a filter cake on the filter media.

Over time, the pressure differential across the depth filter media of the present invention eventually increases in a generally exponential relation. However, that increase is substantially delayed by the depth filter media of the invention and the depth filtration methods associated therewith in order to more nearly approach the straight line characteristics of cake filtration. In the preceding description, the filter media 22 was described as having a filter septum layer 40 formed from generally homogenous cellulosic fibers in order to achieve depth filtration according to the invention. As noted above, the filter septum layer 40 could be formed with or without synthetic microfibers. It is also to be noted that cellulosic fibers of different characteristics could be arranged generally in layers to form the filter septum layer 40. For example, selected cellulosic fibers could be arranged across an upper portion of the filter septum layer 40 in order to form generally larger pores and to receive and trap generally coarser particulate solids. Cellulosic fibers of different characteristics could be selected to form a lower portion of the filter septum layer 40 in order to form smaller pores for trapping finer particulate solids. Such a laminar arrangement (not shown) is described only for purposes of example and illustrates variations contemplated by the present invention for the filter septum layer 40 which is otherwise formed in accordance with the present invention as described above.

In a method of filtration, the filter media 22 is arranged in the filter apparatus such as that indicated at 10 in FIGS. 1 and 2 so that the exposed surface 46 of the filter septum layer 40 is in communication with fluid to be filtered approaching the filter media from the source 16, preferably through the inlet chamber 20A. With the filter media positioned in the filter apparatus, the filter plates 12 and 14 are then clamped together in order to close and seal the inlet and outlet chambers 20A and 20B. The filtration process is then initiated with fluid to be filtered flowing from the source 16 into the inlet chamber 20A, across the filter media 22, into the outlet chamber 20B and then to the outlet 18. The filtration process is continued until the accumulation of particulate solids on and/or in the filter media causes a pressure differential exceeding a predetermined level.

At that time, as noted above, flow of the fluid is interrupted, the filter is evacuated of fluid, the filter plates 12 and 14 are separated and the filter media 22 is laterally shifted by the extractor 26 in order to introduce a fresh portion of the filter media 22 from the supply roll 24 into place within the apparatus 10. The filter plates are then again clamped together and a second filtration cycle continued.

Within a depth filtration operation as described above, particularly when the filter media 22 is laterally removed from the filter apparatus by the extractor 26, sticking has been found to commonly occur between the filter media and the filter plates 12 and 14. More specifically, it has been found that such sticking almost always occurs between one of the filter plates and a wet strength layer adjacent that plate. Generally, it is theorized that such sticking may result because of exposed ends of the wet strength layer 38 tending to have a "fishhook" or "VELCRO" effect. The term "VELCRO" is a trademark for a hook and loop type of fabric for achieving fastening. However, the trademark is believed to be particularly descriptive of the characteristic contemplated in the present invention. It is also theorized that sticking may result from chemical adhesive at the interface 48 being extruded through the thin wet strength layer 38 and adhering in substantial cross-sectional areas to the plate surfaces 34 and 36. With both the wet strength layer and adhesive removed from the upper surface 46 of the filter media 22, most of these causes for sticking tend to be eliminated at least on one side of the filter media 22.

Accordingly, there has been described above a preferred method of depth filtration with an improved depth filter media preferably formed by a method also described above. Various modifications and adaptions are possible in addition to those specifically described above. Accordingly, the invention is defined only by the following claims which are also exemplary of the invention.

What is claimed is:

1. A method of depth filtration wherein a sheet of depth filter media is adapted for use in a filter press to separate a chamber into an inlet chamber and an outlet chamber and wherein fluid to be filtered is caused to flow from the inlet chamber to the outlet chamber through the depth filter media sheet, comprising the steps of selecting the depth filter media sheet to include a filter septum layer adjacent a wet strength layer with one lateral surface of the depth filter media sheet formed by the filter septum layer and an opposite lateral surface of the depth filter media sheet formed by the wet strength layer, the filter septum layer being formed as a matrix from a furnish of both an initial fiber providing substantial loft and porosity throughout the thickness of the depth filter septum layer and a second relatively fine fiber for reducing pore size developed in the filter septum layer by the initial fiber and for structurally reinforcing the initial fiber, arranging the depth filter media sheet between filter plates of the filter press with a lateral surface of the filter septum layer being substantially totally exposed to the inlet chamber so that the porous depth of the filter septum layer is available for receiving and capturing particulate solids from a fluid passing through the depth filter media from the inlet chamber to the outlet chamber, a lateral surface of the wet strength layer being exposed to the outlet chamber, and initiating a depth filtration process with fluid flowing into the inlet chamber and contacting the totally exposed lateral surface of the filter septum layer so that particulate solids from the fluid are received and captured throughout the porous depth of the filter septum layer.

2. The method of claim 1 wherein the initial fiber is subject by itself to reduction of loft and porosity during filtration and the second fiber is selected to reinforce the initial fiber for maintaining loft and porosity during filtration.

3. The method of claim 2 wherein the wet strength layer is bonded to the filter septum layer by an interface bonding agent, the bonding agent being selected to resist solubilization in or chemical reaction with the fluid being filtered.

4. The method of claim 2 wherein a portion of either the wet strength layer or the filter septum is thermoplastic and the wet strength layer is bonded to the filter septum layer by thermal fusion.

5. The method of claim 1 wherein the intial fiber is cellulosic and the second fiber is a synthetic microfiber.

6. The method of claim 1 wherein the wet strength layer is bonded to the filter septum layer at their interface.

7. A depth filter media sheet adapted for use in a filter press to separate a chamber into an inlet chamber and an outlet chamber, the filter press including means for causing fluid to be filtered to flow from the inlet chamber to the outlet chamber, the depth filter media comprising a wet strength layer which is relatively open to minimize restriction to flow while having relatively good tensile characteristics, and a substantially thicker filter septum layer formed as a matrix from furnish of an initial fiber providing substantial loft and porosity throughout the matrix of the filter septum layer and a second relatively fine fiber for reducing pore size developed in the filter septum layer by the initial fiber, the filter septum layer being bonded to the wet strength layer at their interface with the filter septum layer forming a totally exposed lateral surface of the sheet whereby the porous depth of the filter septum layer is available to receive and capture particulate solids from a fluid contacting and entering the totally exposed lateral surface of the filter septum layer so that particulate solids from the fluid are received and captured throughout the porous depth of the filter septum layer prior to the fluid exiting from the opposite surface of the wet strength layer.

8. The depth filter media of claim 7 wherein the intial fiber is subject by itself to reduction of loft and porosity during filtration and the second fiber is selected to reinforce the initial fiber for maintaining loft and porosity during filtration.

9. The depth filter media of claim 7 wherein the initial fiber is cellulosic and the second fiber is a synthetic microfiber.

10. The depth filter media of claim 7 wherein the wet strength layer is bonded to the filter septum layer by an interface bonding agent, the bonding agent being selected to resist solubilization in or chemical reaction with the fluid being filtered.

11. The depth filter media of claim 7 wherein a portion of either the wet strength layer or the filter septum is thermoplastic and the wet strength layer is bonded to the filter septum layer by thermal fusion.

* * * * *